(12) United States Patent
Emerick, Jr.

(10) Patent No.: US 6,313,438 B1
(45) Date of Patent: Nov. 6, 2001

(54) SOLAR HEATED SLEEPING BAG

(76) Inventor: George W. Emerick, Jr., 11325 Woodworth Rd., North Lima, OH (US) 44452

( * ) Notice: Subject to any disclaimer, the term of this patent is extended or adjusted under 35 U.S.C. 154(b) by 0 days.

(21) Appl. No.: 09/707,638

(22) Filed: Nov. 7, 2000

(51) Int. Cl.$^7$ .................................................. H05B 3/00
(52) U.S. Cl. ........................... 219/212; 2/69; 62/3.7; 219/528
(58) Field of Search .................... 2/69; 5/419; 135/90, 135/124, 96; 62/3.7; 200/5 A; 219/211, 212, 528, 545; 320/102

(56) References Cited

U.S. PATENT DOCUMENTS

| D. 337,473 | 7/1993 | Deandrea, Jr. . | |
|---|---|---|---|
| 2,931,373 | * 4/1960 | Larson | 135/90 |
| 4,273,989 | 6/1981 | Hinton et al. . | |
| 4,383,211 | * 5/1983 | Staler | 320/102 |
| 4,484,362 | * 11/1984 | Asher | 2/69 |
| 4,533,821 | * 8/1985 | Sato | 219/545 |
| 4,640,994 | * 2/1987 | Komaki | 200/5 A |
| 4,713,531 | * 12/1987 | Fennekels et al. | 219/545 |
| 4,719,935 | * 1/1988 | Gustafson | 135/124 |
| 4,825,868 | 5/1989 | Susa et al. . | |
| 4,841,587 | * 6/1989 | Carter et al. | 5/419 |
| 4,894,878 | 1/1990 | Roach . | |
| 4,972,533 | 11/1990 | Brown . | |
| 4,996,970 | 3/1991 | Legare . | |
| 5,329,096 | * 7/1994 | Suematsu | 219/528 |
| 5,353,600 | * 10/1994 | Merritt et al. | 62/3.7 |
| 5,528,779 | 6/1996 | Lee et al. . | |
| 5,643,480 | * 7/1997 | Gustavsson et al. | 219/211 |
| 5,699,820 | * 12/1997 | Evans et al. | 135/96 |
| 5,893,991 | 4/1999 | Newell . | |
| 5,986,243 | 11/1999 | Campf . | |
| 6,049,062 | 4/2000 | Jones . | |
| 6,078,026 | * 6/2000 | West | 219/212 |

FOREIGN PATENT DOCUMENTS

| 29912782 | * 2/2000 | (DE) | H05B/3/34 |
|---|---|---|---|
| WO-8810057 | * 12/1988 | (GB) | H05B/3/34 |
| 406327743 | * 11/1994 | (JP) | A61H/33/10 |

* cited by examiner

Primary Examiner—Teresa Walberg
Assistant Examiner—Leonid M Fastovsky
(74) Attorney, Agent, or Firm—Dale J. Ream

(57) ABSTRACT

A solar heated sleeping apparatus has a sleeping bag having a rectangular lower portion and a rectangular upper portion wherein the lower and upper portions are partially connected on corresponding edges and partially fastened by a zipper along the remaining edges thereof. The sleeping apparatus includes a plurality of heating elements disposed within an inner liner of the upper portion. The apparatus further includes a solar cell mounted to a flexible panel and being removably coupled to the sleeping bag. The flexible panel with the solar cell may be removed from the sleeping bag and positioned at a selected angle upon adjustable support legs for receiving solar rays thereon. Solar energy received by the solar cell is connected to an inverter for recharging a battery. A control unit coupled to the battery and to the heating coils allows selected heating coils to be energized for heating the sleeping bag. The rechargeable battery may also be selectively connected to a vehicle power source or to a conventional AC power source for charging.

14 Claims, 4 Drawing Sheets

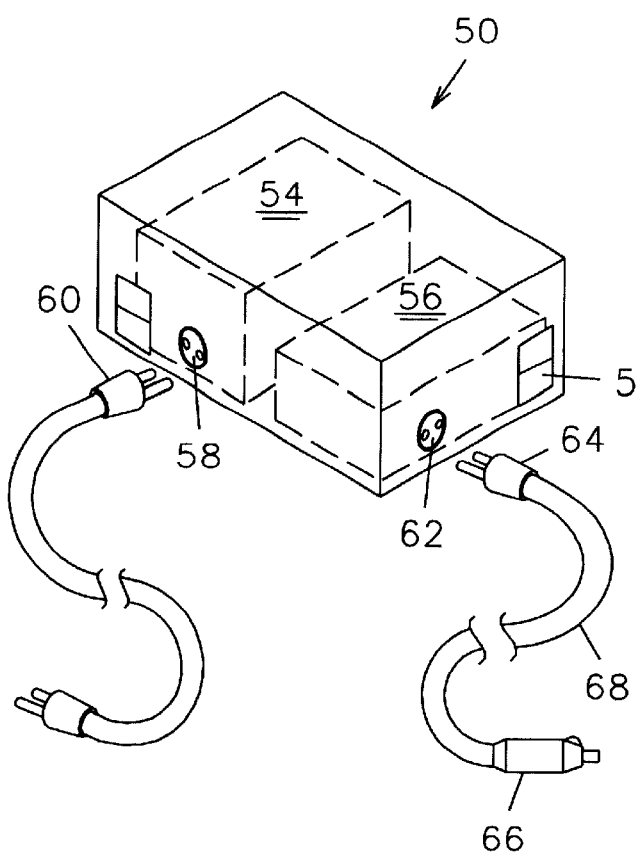
FIG. 4
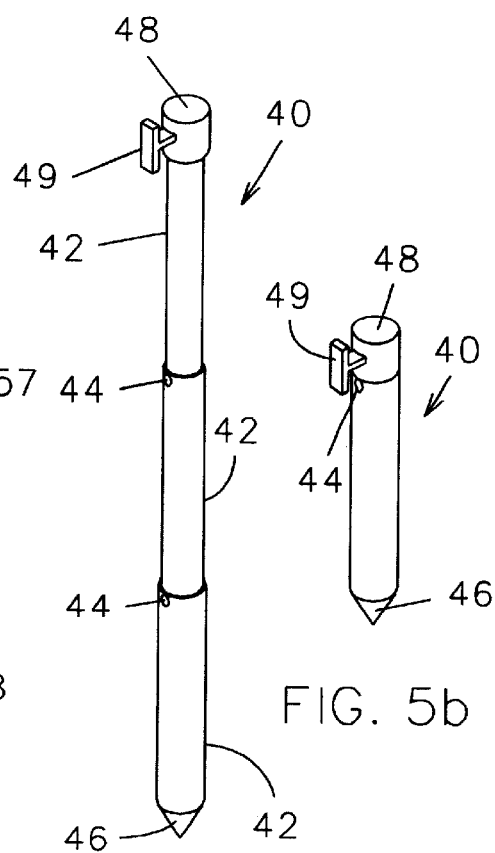
FIG. 5a
FIG. 5b

SOLAR HEATED SLEEPING BAG

BACKGROUND OF THE INVENTION

This invention relates generally to heated sleeping bags and, more particularly, to a heated sleeping bag having heating elements powered by a battery that is rechargeable by energy from a solar cell.

Sleeping bags are used primarily by campers for sleeping in an outdoor environment. When used in a very cold environment, however, maintaining sufficient heat therein during the nighttime hours is a daunting task. Several devices have been proposed in the art for heating an otherwise conventional sleeping bag. As conventional forms of electricity are typically unavailable, such devices are powered by rechargeable batteries. Although assumably effective for their intended purposes, existing apparatuses do not utilize a form of energy that is often readily available to the camper for recharging batteries, that is, solar energy. In addition, existing devices do not provide for selectively heating desired regions of the sleeping bag so as to conserve energy.

Therefore, it is desirable to have a solar heated sleeping apparatus having heating coils that are powered by a battery that is recharged as solar rays impinge upon a solar cell. Further, it is desirable to have a solar heated sleeping apparatus in which various regions of a sleeping bag may be selectively heated. In addition, it is desirable to have a solar heated sleeping apparatus in which the solar cell is mounted upon a flexible panel that may be selectively coupled to the sleeping bag.

SUMMARY OF THE INVENTION

A solar heated personal sleeping apparatus according to the present invention includes a sleeping bag having rectangular lower and upper portions. The lower and upper portions are partially connected along corresponding edges and partially fastened together by a zipper along the remaining edges in a conventional manner. A plurality of heating elements are disposed within an inner liner of the upper portion and are spaced apart from one another therein. The sleeping apparatus further includes a solar cell mounted to a flexible panel, the flexible panel being removably attached to the upper portion of the sleeping bag with snaps or the like. The solar cell comprises a plurality of small, solar modules such that the flexible panel may be rolled up with the sleeping bag for storage without damaging the solar cell. In use, the solar cell is connected to a conventional inverter for regulating the solar energy received from the solar cell and converting the solar energy to electricity. The inverter is connected to at least one rechargeable battery for recharging the battery. The flexible panel with the solar cell may be positioned atop a plurality of adjustable support legs for receiving solar rays thereon at an optimal angle.

The apparatus includes a control unit fixedly attached to an edge of the sleeping bag for regulating the flow of electricity between the rechargeable battery and the heating elements. The control unit includes controls for energizing all or part of the heating elements within the inner liner of the upper portion of the sleeping bag. Thus, the entire space between the upper and lower portions may be heated or just specific regions, as desired (e.g. the torso region or the feet region).

Therefore, a general object of this invention is to provide a heated personal sleeping apparatus for heating a sleeping bag having heating coils disposed therein.

Another object of this invention is to provide a heated personal sleeping apparatus, as aforesaid, that is powered by a rechargeable battery.

Still another object of this invention is to provide a heated personal sleeping apparatus, as aforesaid, having a solar cell for providing electrical power upon solar rays impinging thereon.

Yet another object of this invention is to provide a heated personal sleeping apparatus, as aforesaid, in which the solar cell is mounted upon a flexible panel that is removably coupled to the sleeping bag and may be rolled up therewith for transport or storage.

A further object of this invention is to provide a heated personal sleeping apparatus, as aforesaid, having a control unit for selectively energizing predetermined heating elements within the sleeping bag.

A still further object of this invention is to provide a heated personal sleeping apparatus, as aforesaid, in which the sleeping bag is waterproof.

A particular object of this invention is to provide a heated personal sleeping apparatus, as aforesaid, that is easy to manufacture and use.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 4 is a perspective view of an electricity regulator and storage unit;

FIG. 5a is a perspective view of a support leg in an extended configuration; and FIG. 5b is a perspective view of a support leg in a retracted configuration.

DESCRIPTION OF THE PREFERRED EMBODIMENT

Figure 1:
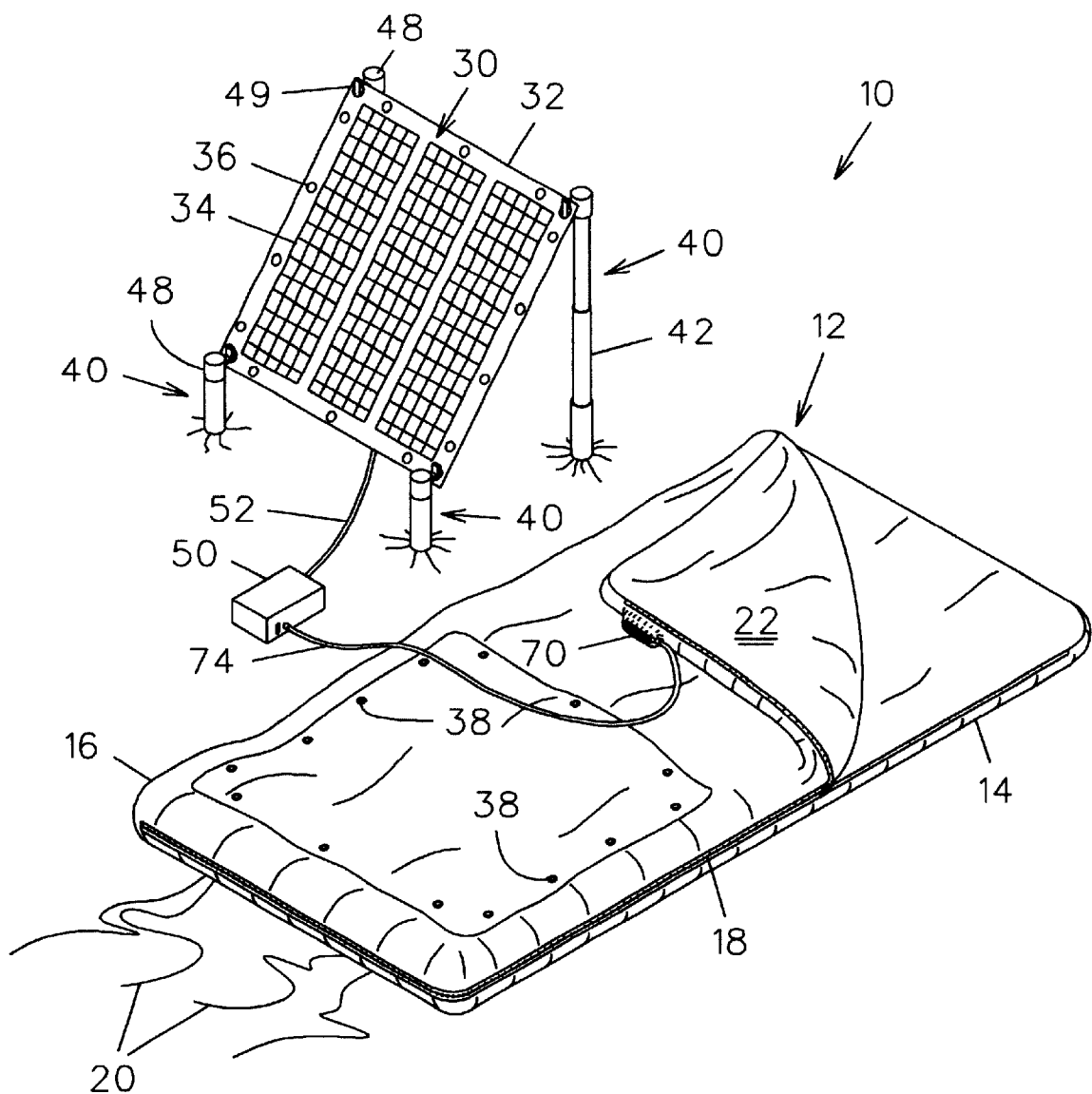
FIG. 1 is a perspective view of a solar powered personal sleeping apparatus according to the present invention with the solar panel removed from the sleeping bag in a use configuration.

A solar powered heated sleeping apparatus 10 according to the present invention will now be described with reference to FIGS. 1 through 5b of the accompanying drawings. The sleeping apparatus 10 includes a sleeping bag 12 having rectangular lower 14 and upper portions 16. Each portion has left and right edges, an upper (head) end, and a lower (foot) end. The lower 14 and upper 16 portions are fixedly connected along corresponding left edges and removably fastened together along rear and right edges with a zipper 18 (FIG. 1). The edges of corresponding head ends are not connected. The outer surfaces of each portion are constructed of a waterproof material. Tie straps 20 depend from the lower end of the lower portion 14 for securing the sleeping bag 12 in a rolled-up storage configuration. To this extent, the sleeping bag 12 presents a conventional construction. At least the upper portion 16 of the sleeping bag 12 further includes an inner liner 22. A plurality of heating coils 24 are disposed in a spaced apart relationship within the inner liner 22 (FIG. 3).

Figure 2:
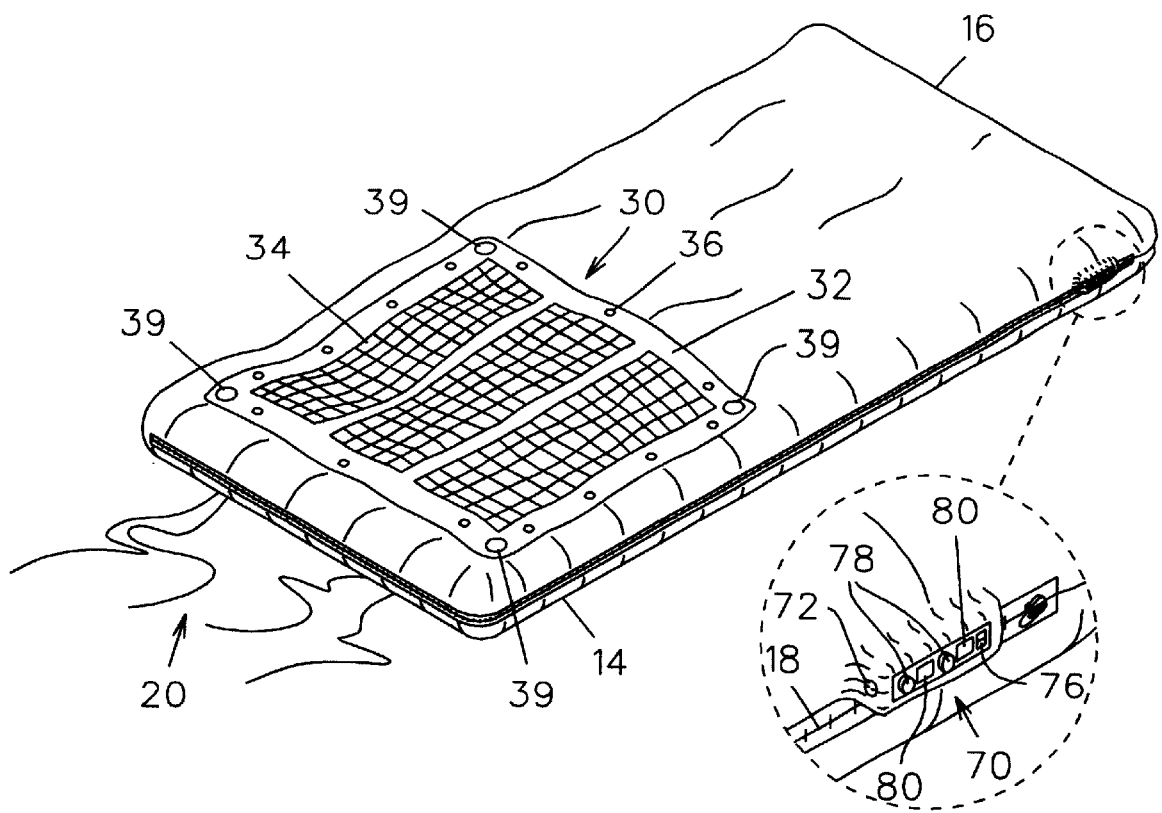
FIG. 2 is a perspective view of the sleeping apparatus as in claim 1 with the solar panel connected to the sleeping bag and with an isolated view on an enlarged scale of the control unit.
Figure 3:
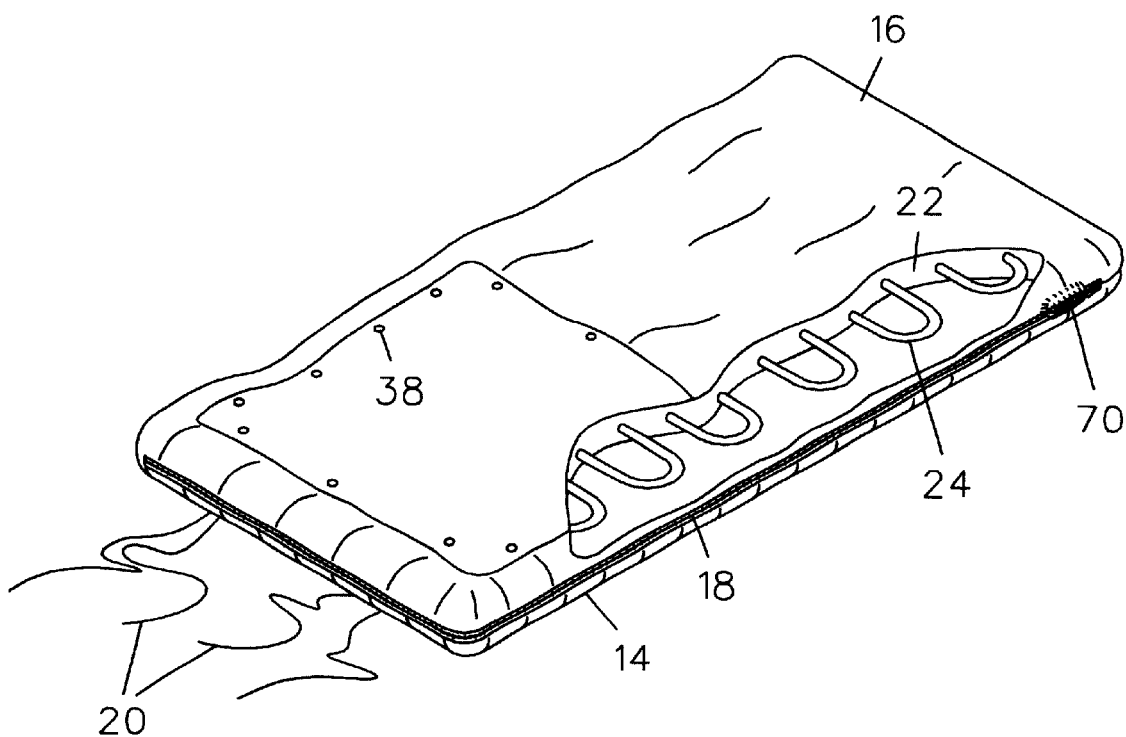
FIG. 3 is a perspective view of the sleeping apparatus as in claim 2 with a portion of an upper portion cut away.

The sleeping apparatus 10 further includes a solar cell 30 mounted to a flexible solar panel 32 (FIGS. 1 and 2). The flexible solar panel 32 is preferably constructed of a resilient fabric material and includes fasteners 36 such as snaps about its peripheral edge. Corresponding fasteners 38 are positioned about a portion of the upper portion 16 of the sleeping bag 12 such that the solar panel 32 may be removably coupled thereto. The solar cell 30 comprises a plurality of thin, flexible, square-shaped solar cell modules 34. Therefore, the solar panel 32 may be removed from the sleeping bag 12 so as to receive solar rays thereon or coupled to the upper portion 16 for storage or transport. The solar panel 32 and solar cell 30 may be rolled up with the sleeping bag 12 without damaging the solar cell modules 34.

The sleeping apparatus 10 includes a plurality of support legs 40 adapted to support the solar panel 32 above a ground surface in a use configuration (FIG. 1). Each support leg 40 includes a plurality of telescopic sleeves 42 for slidably adjusting the leg between extended and retracted configurations (FIGS. 5a and 5b). Each leg 40 may be held in a selected configuration with a spring-biased button 44, pin, or the like. Each leg 40 further includes a conical tip 46 such that the leg 40 may be driven easily into a ground surface, as in the case of a tent stake. An opposing end of each leg 40 includes a cap 48 having a construction suitable for receiving an impact force such as from a hammer. A T-shaped hook member 49 extends from a respective cap 48 and is normal to a respective leg 40. The flexible solar panel 32 defines apertures 39 at each corner that are configured to removably mate with a corresponding hook member 49. Therefore, the support legs 40 may be positioned in the ground, the height of each leg 40 adjusted as desired, and corners of the solar panel 32 coupled to the hook members 49 such that solar rays impinge upon the solar cell modules 34 at the optimal angle.

The solar cell 30 is electrically connected to an electricity regulator and storage unit 50 with a wire 52 (FIG. 1). The regulator and storage unit 50 includes at least one rechargeable battery 54 and an electrical inverter 56. It is understood that the battery or batteries may alternately be housed in a pouch sewn into the side of the sleeping bag 12. The inverter 56 regulates the power received from the solar cell 30 for use in recharging the battery 54, the inverter having an on/off switch 57 associated therewith. It is understood that a trickle circuit (not shown) may also be used to regulate the speed at which power received from the solar cell 30 is delivered to the battery 54. In addition, the regulator and storage unit 50 includes a receptacle 58 for receiving the male end of an electrical plug 60 such that AC current may be delivered to the battery 54 from an AC power source. Further, the inverter 56 includes a receptacle 62 for receiving a plug 64 from either the solar cell or a vehicle power source, such as from a cigarette lighter. More particularly, an electrical adapter 66 provides electrical power from a vehicle to the inverter 56 through a wire 68.

A control unit 70 is fixedly attached to the upper portion 16 of the sleeping bag 12 and includes a socket 72 for selectively electrically connecting the control unit 70 to the regulator and storage unit 50 with a wire 74 (FIGS. 1 and 2). The control unit 70 includes an on/off switch 76 and at least two adjustment knobs 78 and corresponding displays 80. Each knob 78 is electrically connected to predetermined heating coils 24 such that those coils may be independently energized and controlled to reach desired temperatures. In other words, coils positioned in the lower (foot) half of the upper portion 16 may be controlled independently of coils positioned in the upper (torso) half of the upper portion 16. This allows a user to more carefully regulate the location or amount of heat in various regions of the sleeping bag or to conserve battery power by only heating a portion thereof, if desired.

In use, the solar panel 32 which is snappably coupled to the upper portion 16 of the sleeping bag 12 may be removed therefrom when solar energy needs to be collected. The support legs 40 may be driven into the ground and telescopically adjusted for height such that the solar panel 32 may be coupled to the hook members 49 thereon in a desired angular configuration. In this position, the solar cell modules 34 may receive direct solar rays. Electrical power from the solar cell 30 is delivered to the inverter 56 within the regulator and storage unit 50. Once regulated by the inverter 56, this power is delivered to the rechargeable battery 54. The regulator and storage unit 50 may then be connected to the control unit 70 of the upper portion 16 and the heating coils may be selectively energized for heating desired portions of the upper portion 16.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A solar heated sleeping bag, comprising:

a rectangular lower portion having an upper end, left and right sides, and a lower end;

a rectangular upper portion having an inner liner and an upper end, left and right sides, and a lower end, said lower and upper portions being fixedly secured to each other along corresponding left sides and removably secured to each other along corresponding rear and right sides;

a plurality of heating elements disposed in said inner liner in said upper portion;

a solar cell for providing electrical power upon solar rays impinging thereon;

means for regulating said electrical power received from said solar cell;

at least one rechargeable battery connected to said regulating means; and means for selectively delivering current from said at least one battery to said plurality of heating elements for heating said upper portion.

2. A sleeping bag as in claim 1 wherein said solar cell is mounted on a flexible panel adapted to be removably coupled to said upper portion.

3. A sleeping bag as in claim 1 further comprising a zipper for selectively securing corresponding rear and right sides of said upper and lower portions to each other.

4. A sleeping bag as in claim 1 wherein said upper and lower portions are formed of a waterproof material.

5. A sleeping bag as in claim 1 wherein said delivering means includes a control unit adapted to selectively deliver current to predetermined heating elements.

6. A sleeping bag as in claim 1 further comprising an electrical connector assembly including connection means for connecting said at least one rechargeable battery with a vehicle power source for recharging said at least one rechargeable battery.

7. A personal solar heated sleeping apparatus, comprising:

a sleeping bag comprising:

a rectangular lower portion;

a rectangular upper portion having an inner liner, said lower and upper portions being partially connected on corresponding edges and partially fastened by a zipper along remaining edges thereof;

a plurality of heating elements disposed in spaced apart relationship within said inner liner;

a solar cell for providing electrical power upon solar rays impinging thereon;

means for regulating said electrical power received from said solar cell;

at least one rechargeable battery connected to said regulating means; and a control unit coupled to said upper portion of said sleeping bag and electrically connected to said at least one rechargeable battery and said plurality of heating elements, said control unit being adapted to selectively deliver current from said at least one rechargeable battery to predetermined heating elements for heating selected regions of said upper portion of said sleeping bag.

8. An apparatus as in claim 7 wherein said solar cell is mounted on a flexible panel adapted to be removably coupled to said upper portion of said sleeping bag.

9. An apparatus as in claim 8 further comprising a plurality of support legs adapted to support said flexible panel above a ground surface at an angle such that said solar cell receives solar rays thereon when said flexible panel is not coupled to said upper portion of said sleeping bag, each support leg having a plurality of telescopic sleeves adapted to be vertically adjusted to a desired configuration.

10. An apparatus as in claim 9 wherein each support leg includes a T-shaped hook member extending from an upper end thereof and said flexible panel defines a plurality of apertures adapted to mate with corresponding hook members for removably mounting said flexible panel to said support legs.

11. An apparatus as in claim 7 wherein said upper and lower portions are formed of a waterproof material.

12. An apparatus as in claim 7 further comprising an electrical connector assembly including a first connection means for connecting said at least one rechargeable battery with a vehicle power source for recharging said at least one rechargeable battery.

13. An apparatus as in claim 7 further comprising an electrical connector assembly including a second connection means for connecting said at least one rechargeable battery with an AC power source for recharging said at least one rechargeable battery.

14. A personal solar heated sleeping apparatus, comprising:

a sleeping bag comprising:
   a rectangular lower portion;
   a rectangular upper portion having an inner liner, said lower and upper portions being partially connected on corresponding edges and partially fastened by a zipper along remaining edges thereof;
   a plurality of heating elements disposed in spaced apart relationship within said inner liner;

a flexible solar panel for providing electrical power upon solar rays impinging thereon, said flexible solar panel being removably coupled to said upper portion of said sleeping bag;

means for regulating said electrical power received from said solar cell;

at least one rechargeable battery connected to said regulating means;

a control unit coupled to said upper portion of said sleeping bag and electrically connected to said at least one rechargeable battery and said plurality of heating elements, said control unit being adapted to selectively deliver current from said at least one rechargeable battery to predetermined heating elements for heating selected regions of said upper portion of said sleeping bag; and an electrical connector assembly including connection means for connecting said at least one rechargeable battery with a vehicle power source for recharging said at least one rechargeable battery.

* * * * *